United States Patent
Nagasawa

(10) Patent No.: US 9,394,019 B2
(45) Date of Patent: Jul. 19, 2016

(54) VEHICLE BODY STRUCTURE AND METHOD FOR PRODUCING VEHICLE BODY

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/476,526

(22) Filed: Sep. 3, 2014

(65) Prior Publication Data

US 2015/0084373 A1    Mar. 26, 2015

(30) Foreign Application Priority Data

Sep. 26, 2013  (JP) ................................. 2013-200498

(51) Int. Cl.
| | | |
|---|---|---|
| B62D 25/08 | (2006.01) | |
| B62D 65/02 | (2006.01) | |
| B62D 25/04 | (2006.01) | |
| B62D 27/02 | (2006.01) | |

(52) U.S. Cl.
CPC ............... *B62D 65/02* (2013.01); *B62D 25/04* (2013.01); *B62D 27/02* (2013.01); *Y10T 29/49622* (2015.01)

(58) Field of Classification Search
CPC .............................. B62D 25/08; B62D 25/081
USPC .................. 296/192, 203.02, 203.03, 193.05, 296/193.06, 193.09, 187.09, 187.1, 29
See application file for complete search history.

(56) References Cited

U.S. PATENT DOCUMENTS

| | | | | |
|---|---|---|---|---|
| 4,950,024 | A * | 8/1990 | Watari et al. ................. | 296/192 |
| 5,061,009 | A * | 10/1991 | Harasaki et al. ............ | 296/192 |
| 7,140,674 | B2 * | 11/2006 | Miyoshi et al. .......... | 296/203.03 |
| 8,651,563 | B2 * | 2/2014 | Mildner et al. .......... | 296/203.02 |
| 2011/0156446 | A1 * | 6/2011 | Iwase et al. .............. | 296/193.06 |
| 2013/0113237 | A1 * | 5/2013 | Huhn ....................... | 296/193.05 |

FOREIGN PATENT DOCUMENTS

| | | |
|---|---|---|
| JP | 48-131045 | 11/1973 |
| JP | 2004-299633 | 10/2004 |
| JP | 2008-037269 | 2/2008 |
| JP | 2008-254631 | 10/2008 |
| JP | 2011-235688 | 11/2011 |
| JP | 2012-096717 | 5/2012 |
| JP | 2013-032036 | 2/2013 |

* cited by examiner

*Primary Examiner* — H Gutman

(74) *Attorney, Agent, or Firm* — Smith, Gambrell & Russell, LLP

(57) ABSTRACT

A vehicle body structure includes a toe board panel that extends in a width direction of the vehicle body rotatably supporting wheels of the vehicle and that divides the vehicle body into a front compartment and a passenger compartment, and an A-pillar connected with the toe board panel in a part corresponding to a front corner or a rear corner of the passenger compartment in a side part of the vehicle body. The toe board panel has an inner flange provided on an end thereof in the width direction. The A-pillar has an outer flange. The toe board panel and the A-pillar are joined such that a joined section joining the inner flange and the outer flange is bent outward in the width direction.

19 Claims, 8 Drawing Sheets

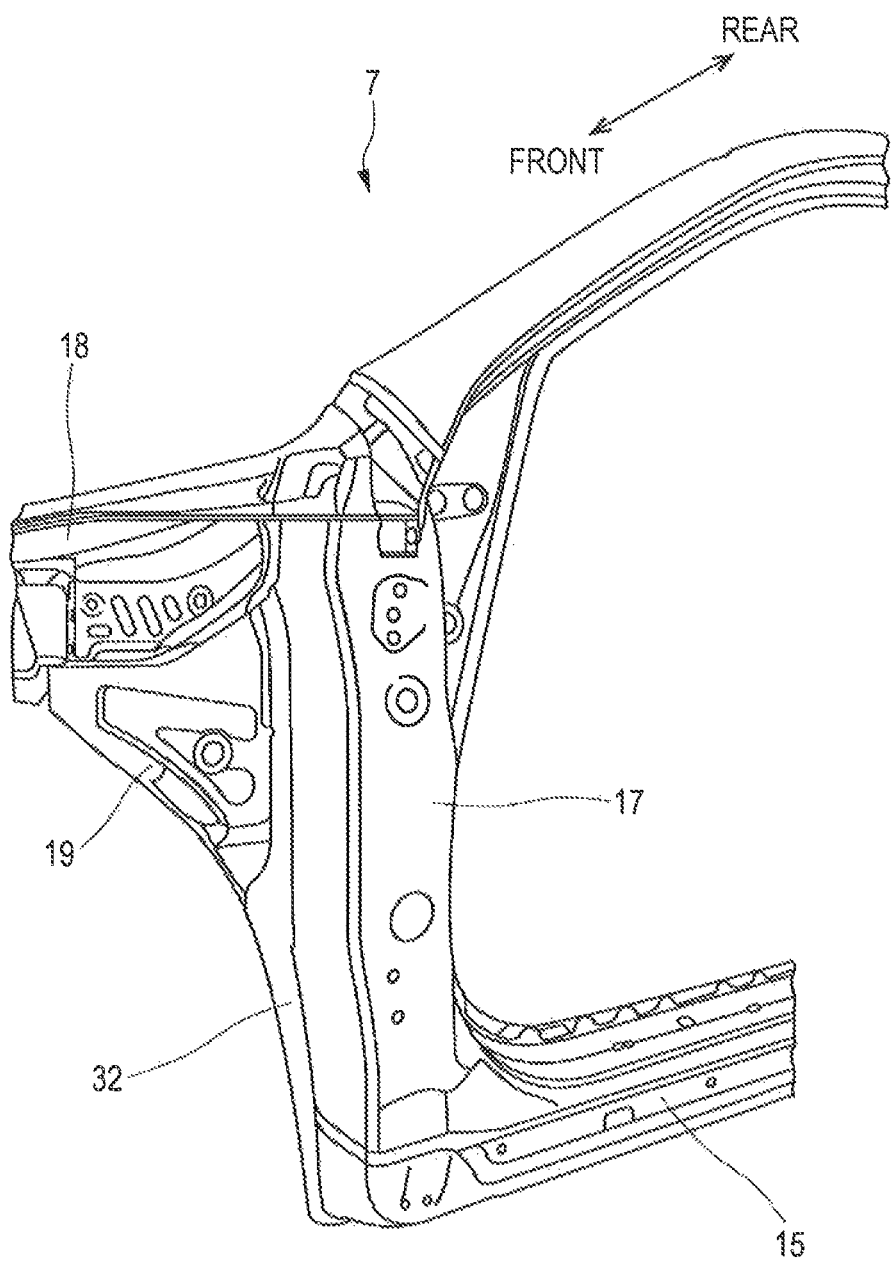

VEHICLE BODY STRUCTURE AND METHOD FOR PRODUCING VEHICLE BODY

CROSS-REFERENCE TO RELATED APPLICATIONS

The present application claims priority from Japanese Patent Application No. 2013-200498 filed on Sep. 26, 2013, the entire contents of which are hereby incorporated by reference.

BACKGROUND

1. Technical Field

The present invention relates to a vehicle body structure such as a motor vehicle and a method for producing a vehicle body.

2. Related Art

A vehicle body structure of a front part of a motor vehicle is disclosed in Japanese Unexamined Patent Application Publication (JP-A) No. 2004-299633, JP-A No. 2012-096717, and JP-A No. 2011-235688. In these patent documents, each of a pair of A-pillars is connected with a corresponding side of a dash panel in the panel width direction. The dash panel is used as a toe board panel that divides a vehicle body into a front compartment and a passenger compartment. The passenger compartment is formed by joining the toe board panel and the pair of A-pillars.

Since the pair of A-pillars are connected with the right and left sides of the toe board panel, a side structure of the vehicle body having an A-pillar can be set on and connected with a side face of a center structure having the toe board of the vehicle body, thereby facilitating production of the vehicle body.

However, in order to superpose and join the toe board panel and the A-pillar, it is necessary to provide an inner flange on an end of the toe board panel in its width direction and to provide an outer flange on a side panel of the A-pillar, and further to superpose the inner flange and the outer flange and to join the inner and outer flanges by spot welding and the like. As a result, a joined section having the inner and outer flanges extends forward from the faces of the toe board panel and the A-pillar.

Although there is a possibility of a vehicle such as a motor vehicle colliding with an oncoming vehicle travelling at a high speed, this type of collision is not tested in present collision safety standards. Such a collision causes a strong impact on the vehicle. As a result, there is a possibility of a front wheel of the crashed vehicle becoming detached from the vehicle body and the detached front wheel being pushed against the toe board panel or the like.

When the detached front wheel is pushed against the toe board panel from the front side, there is a possibility of the toe board panel being deformed and a pulling-off force being applied to the joined section which extends forward. If the outer flange is peeled off from the inner flange, the connection is broken to form a gap between the toe board panel and the A-pillar.

Thus, it is required that the pulling-off force be negligibly applied to a joined section between a partition panel such as the toe board panel and a side panel such as the A-pillar and that collision safety performance of the vehicle be further enhanced.

SUMMARY OF THE INVENTION

A first aspect of the present invention provides a vehicle body structure: a partition panel that extends in a width direction of a vehicle body rotatably supporting wheels of the vehicle and that divides the vehicle body into a front compartment or a rear compartment and a passenger compartment; and a side panel connected with the partition panel in a part corresponding to a front corner or a rear corner of the passenger compartment in a side part of the vehicle body. The partition panel has an inner flange provided on an end in the width direction. The side panel has an outer flange. The partition panel and the side panel are joined such that a joined section joining the inner flange and the outer flange is bent outward in the width direction.

The side panel may be a member having a pillar located at the front corner or the rear corner of the passenger compartment.

The joined section may be bent outward at a region located in a front-back direction with respect to wheels rotatably supported on the vehicle body.

The joined section may be bent outward at a region located in the front-back direction with respect to at least a rotation center of the wheel.

The vehicle body structure may further include: a center structure having the partition panel and forming a center part in the width direction of the vehicle body; and a side structure having the side panel and forming a side part of the vehicle body as a result of the side panel being set on a side face of the center structure in the width direction. The inner flange of the center structure may extend from an end of the partition panel in the front-back direction. The outer flange may extend from periphery of the side structure in the front-back direction. The center structure and the side structure may be joined such that a joined section joining the inner flange and the outer flange on each other and extending in the front-back direction is bent outward in the width direction.

The inner flange and the outer flange may be joined by tack welding.

A second aspect of the present invention provides a method for producing a vehicle body that rotatably supports wheels of the vehicle includes the steps of: for joining a center structure, which has a partition panel dividing the vehicle body into a front compartment or a rear compartment and a passenger compartment, and a side structure, which has a side panel defining the passenger compartment as a result of connecting the side panel with the partition panel; joining an inner flange, which extends in a front-back direction from an end of the partition panel in a width direction of the vehicle body, and an outer flange, which is provided on the side panel at a part corresponding to a front corner or a rear corner of the passenger compartment; and bending a joined section, which is formed as a result of joining the inner flange and the outer flange and extends in the front-back direction, outward in the width direction of the vehicle body.

BRIEF DESCRIPTION OF THE DRAWINGS

FIG. 3 is a perspective view of a part of a side structure to be used in production of the vehicle body illustrated in FIG. 1;

DETAILED DESCRIPTION

An example of the present invention will be described below with reference to the drawings.

Figure 1:
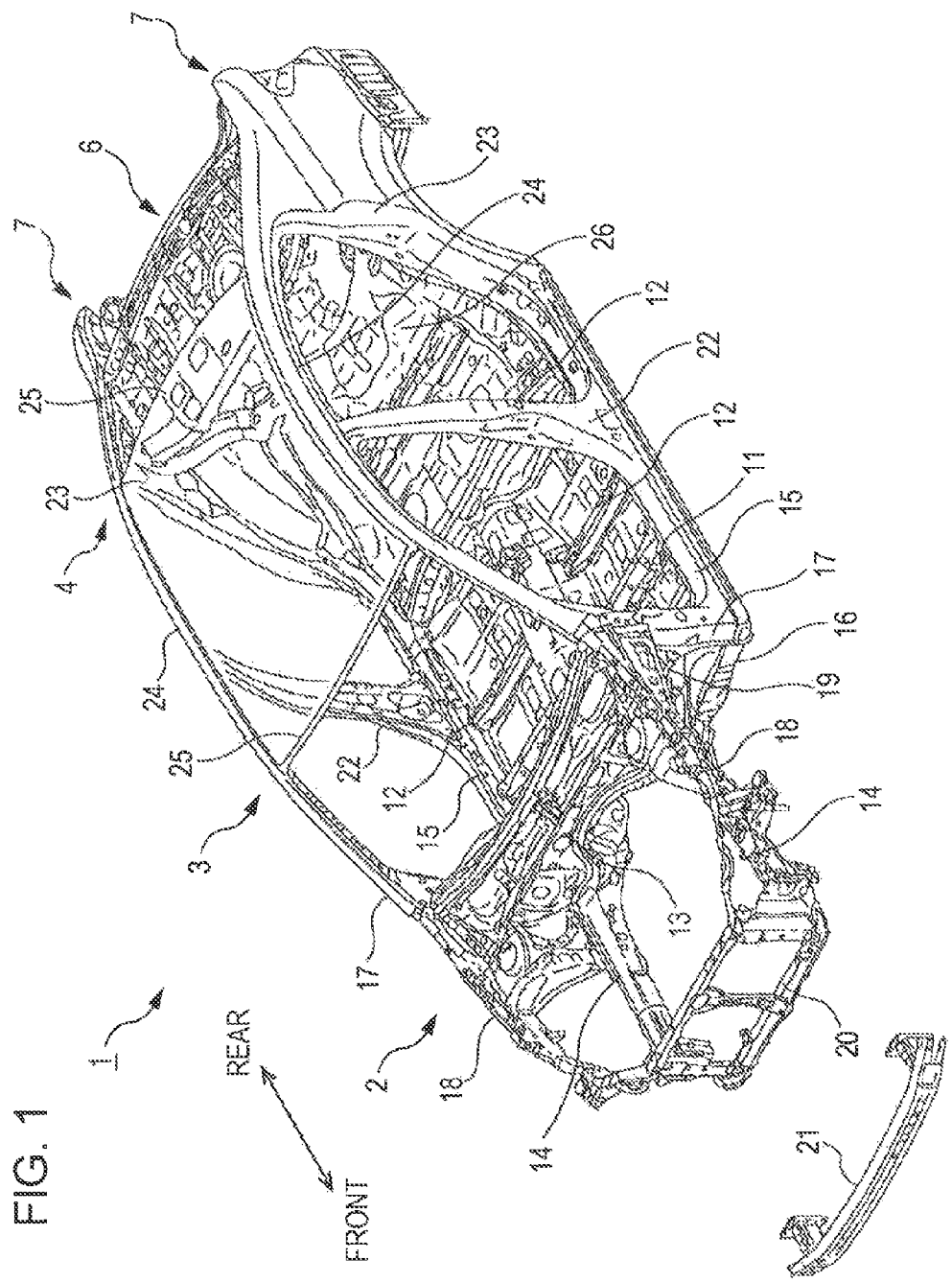
FIG. 1 is a perspective view of a vehicle body of a vehicle according to an example of the invention.

FIG. 1 is a perspective view of a vehicle body 1 of a motor vehicle according to the invention. The vehicle body 1 illustrated in FIG. 1 has a three-box structure including a front compartment 2 in which an engine and the like are disposed, a passenger compartment 3 in which a driver and passengers ride, and a rear compartment 4 in which a baggage and the like are contained.

A floor panel 11 in the passenger compartment 3 is provided on both sides with a pair of floor members that extend in the front-back direction of the vehicle body 1 and a plurality of floor cross members 12 that extend in the width direction of the vehicle body 1. The pair of floor members and the plural floor cross members 12 are joined together at points where they intersect. This double cross structure stiffens the floor panel 11 in the passenger compartment 3.

The floor panel 11 is provided on its front end with a toe board panel 13. The toe board panel 13 divides the vehicle body 1 into the passenger compartment 3 and the front compartment 2.

A pair of front side members 14 are connected with front ends of the pair of floor members. The pair of front side members 14 extend in the front-back direction in the front compartment 2. A front cross member (not illustrated) is secured to the pair of front side members 14. An axle (not illustrated) is disposed on the front cross member. The axle extends in the width direction of the vehicle body 1 and a pair of front wheels are rotatably attached to opposite ends of the axle of the vehicle. The pair of wheels are located to the front of the toe board panel 13.

A pair of side sills 15 are connected with opposite edges of the plural floor cross members 12 in the width direction of the vehicle body 1. A torque box 16 is provided between the side sills 15 and between the front side members 14 and the floor members.

An A-pillar 17 stands on a front end of the side sill 15. A pair of A-pillars 17 are connected with opposite ends of the toe board panel 13 in the width direction of the vehicle body 1.

A front upper member 18 is connected with a center portion of each A-pillar 17 in an upper-lower direction of the A-pillar 17. The front upper member 18 extends forward from the A-pillar 17. A stiffening member for reinforcement 19 (see FIG. 3) is disposed under the A-pillar 17 and the front upper member 18. The stiffening member 19 for reinforcement is connected with the A-pillar 17 and the front upper member 18. Front ends of the A-pillars 17 together with front ends of the pair of front side members 14 are connected with a radiator frame 20. A front bumper beam 21 is fixed on the front face of the radiator frame 20.

A B-pillar 22 stands on a center part of the side sill 15 and a C-pillar 23 stands on a rear end of the side sill 15. A roof side rail 24 is connected with upper ends of the A-pillar 17 and the C-pillar 23. The upper end of the B-pillar 22 is connected with a center part of the roof side rail 24. A pair of roof cross members 25 are connected with the pair of roof side rails 24 in the width direction of the vehicle body 1.

A front door (not illustrated) is attached to the A-pillar 17 in an openable manner. A front door beam and a front door cross member are provided in the front door. A rear door (not illustrated) is attached to the B-pillar 22 in an openable manner. A rear door beam and a rear door cross member are provided in the rear door.

A rear bulkhead panel 26 is provided on a rear edge of the floor panel 11. The passenger compartment 3 and the rear compartment 4 are separated from each other by the rear bulkhead panel 26. The pair of C-pillars 23 are connected with opposite ends of the rear bulkhead panel 26 in the width direction of the vehicle body 1.

The rear side members are connected with corresponding rear ends of the side sills 15. The pair of rear side members extend rearward from the rear bulkhead panel 26. A rear bumper beam is secured to rear edges of the pair of rear side members.

The vehicle body 1 having the frame structure illustrated in FIG. 1 can be produced by connecting the pair of side structures 7 having the A-pillars 17 and the like with opposite edges of the center structure 6 having, for example, the toe board panel 13 and the like in the width direction of the vehicle body 1. The vehicle body 1 of the motor vehicle is completed by connecting exterior plates such as a bonnet hood pate, right and left fender plates, a trunk lid plate, and a roof plate with the vehicle body 1 having the frame structure illustrated in FIG. 1. Thus, the front compartment 2, the passenger compartment 3, and the rear compartment 4 are defined.

A plurality of frame members in the center structure 6 or the side structure 7 may be joined by tack welding such as spot welding and laser welding. The toe board panel 13 and the A-pillar panel 17 are welded together as is the case with the tack welding.

Figure 2:
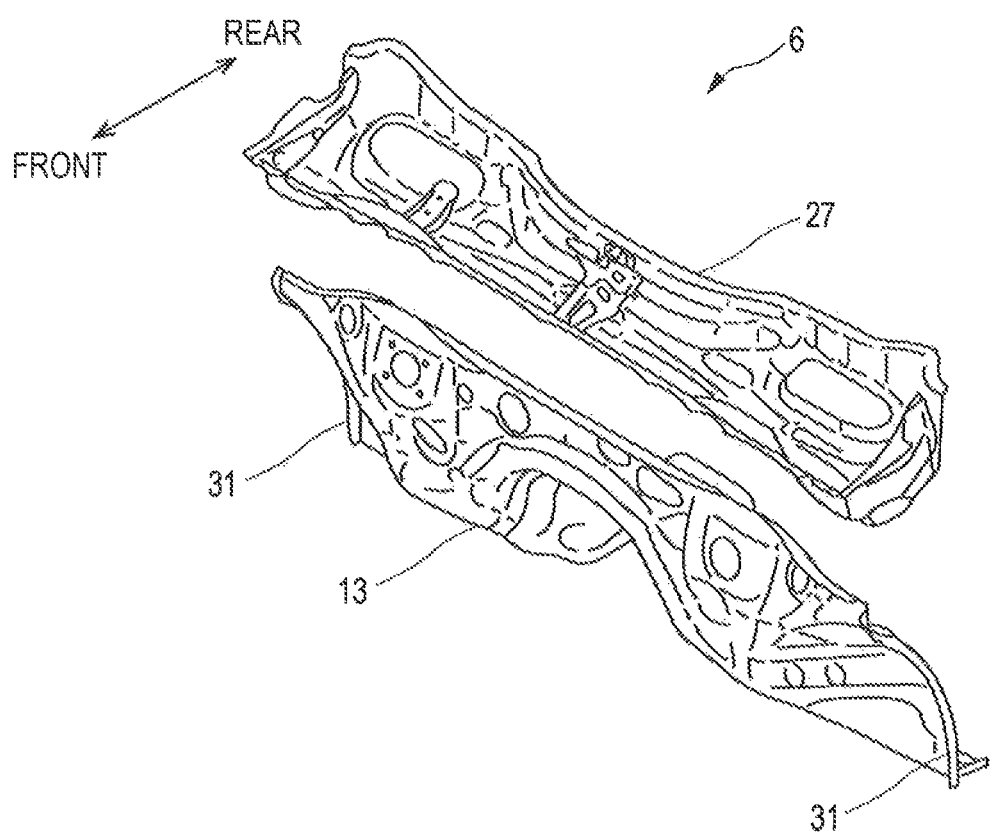
FIG. 2 is a partially exploded perspective view of a center structure to be used in production of the vehicle body illustrated in FIG. 1.

FIG. 2 is a partially exploded perspective view of the center structure 6 to be used in the vehicle body 1 illustrated in FIG. 1.

The toe board panel 13 and a dash panel 27 that constitute the center structure 6 are illustrated in FIG. 2. The dash panel 27 is connected with an upper end of the toe board panel 13. Thus, a front wall of the passenger compartment 3 is formed. The center structure 6 forms a center part of the vehicle body 1 in the width direction of the vehicle body 1.

The toe board panel 13 is formed from, for example, a metal sheet. The toe board panel 13 is provided on its opposite ends in the width direction of the vehicle body 1 with a pair of inner flanges 31. The inner flanges 31 extend in a vertical direction from the sides of the toe board panel 13. The inner flanges 31 extend forward from opposite ends of the toe board panel 13.

FIG. 3 is a perspective view of a part of the side structure 7 to be used in the vehicle body 1 illustrated in FIG. 1.

FIG. 3 illustrates the A-pillar 17, the side sill 15, the front upper member 18, and the stiffening member 19 for reinforcement that constitute the side structure 7. The A-pillar 17 stands on and is connected with a front end of the side sill 15. The front upper member 18 is connected with a center part of the A-pillar 17. The stiffening member 19 for reinforcement is connected with the front upper member 18 and the A-pillar 17.

The side structure 7 fitted to a side face of the center structure 6 in the width direction forms a side face of the vehicle body 1.

The A-pillar 17 has an outer flange 32. The outer flange 32 extends vertically along a front edge of the A-pillar 17 that extends vertically. The outer flange 32 extends forward from a front edge of the A-pillar 17 in the side structure 7.

Figure 4A:
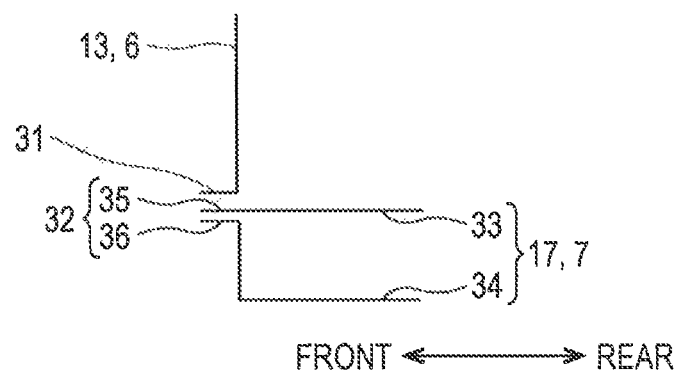
FIG. 4A through FIG. 4C are explanatory views which illustrate steps of joining the center structure and the side structure.
Figure 4B:
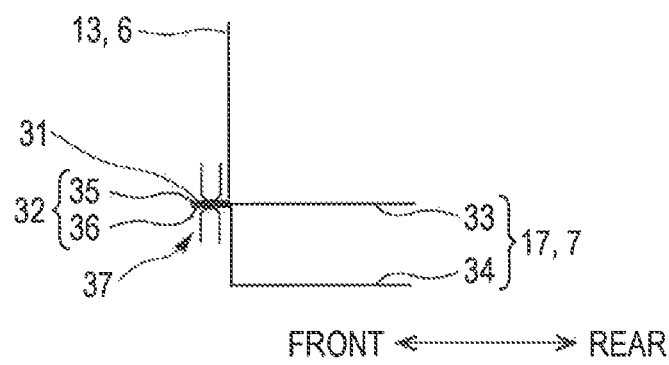
Figure 4C:
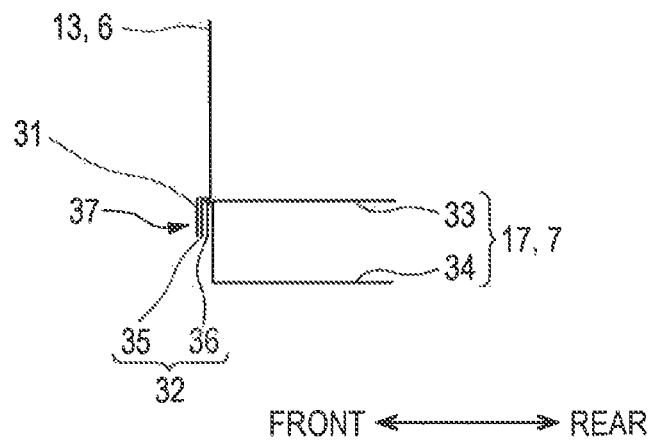

FIGS. 4A through FIG. 4C are explanatory views which illustrate steps of joining the center structure 6 and the side structure 7.

FIGS. 4A through 4C illustrate cross section views of the toe board panel 13 of the center structure 6 and the A-pillar 17 of the side structure 7. The A-pillar 17 illustrated in FIGS. 4A through 4C has a cross section structure in which an inner side panel 33 and an outer side panel 34 are superposed on each other.

The inner side panel 33 is formed from, for example, a metal sheet and has a first outer flange 35. The first outer flange 35 extends vertically along a front edge of the inner side panel 33 that extends vertically.

The outer side panel 34 is formed from, for example, a metal sheet and has a second outer flange 36. The second outer flange 36 extends vertically along a front edge of the outer side panel 34 that extends vertically.

In the A-pillar 17 illustrated in FIGS. 4A through 4C, the outer flange 32 of the A-pillar 17 is formed of the stacked first and second outer flanges 35 and 36.

In the case of joining the center structure 6 and the side structure 7, in a first step, as illustrated in FIG. 4A, the A-pillar 17 of the side structure 7 is disposed next to the toe board panel 13. The inner flange 31 and the outer flange 32 are stacked.

In a second step, as illustrated in FIG. 4B, the inner flange 31 of the toe board panel 13 and the outer flange 32 of the A-pillar 17 are superposed with each other and the inner and outer flanges 31 and 32 are joined by spot welding or the like. Thus, a joined section 37 between the inner flange 31 of the toe board panel 13 and the outer flange 32 of the A-pillar 17 is formed.

In the case of joining the inner flange 31 and the outer flange 32 by spot welding or the like, a plurality of joined points made by the spot welding are separated from one another by a given distance.

In a third step, as illustrated in FIG. 4C, the joined section 37 is bent outward in the width direction of the vehicle body 1. The bent joined section 37 is positioned on the front side of the A-pillar 17. When viewed from a front side of the vehicle body 1, the bent joined section 37 is superposed on a front face of the A-pillar 17. Thus, the center structure 6 and the side structure 7 are joined to make the vehicle body 1 illustrated in FIG. 1.

Figure 5:
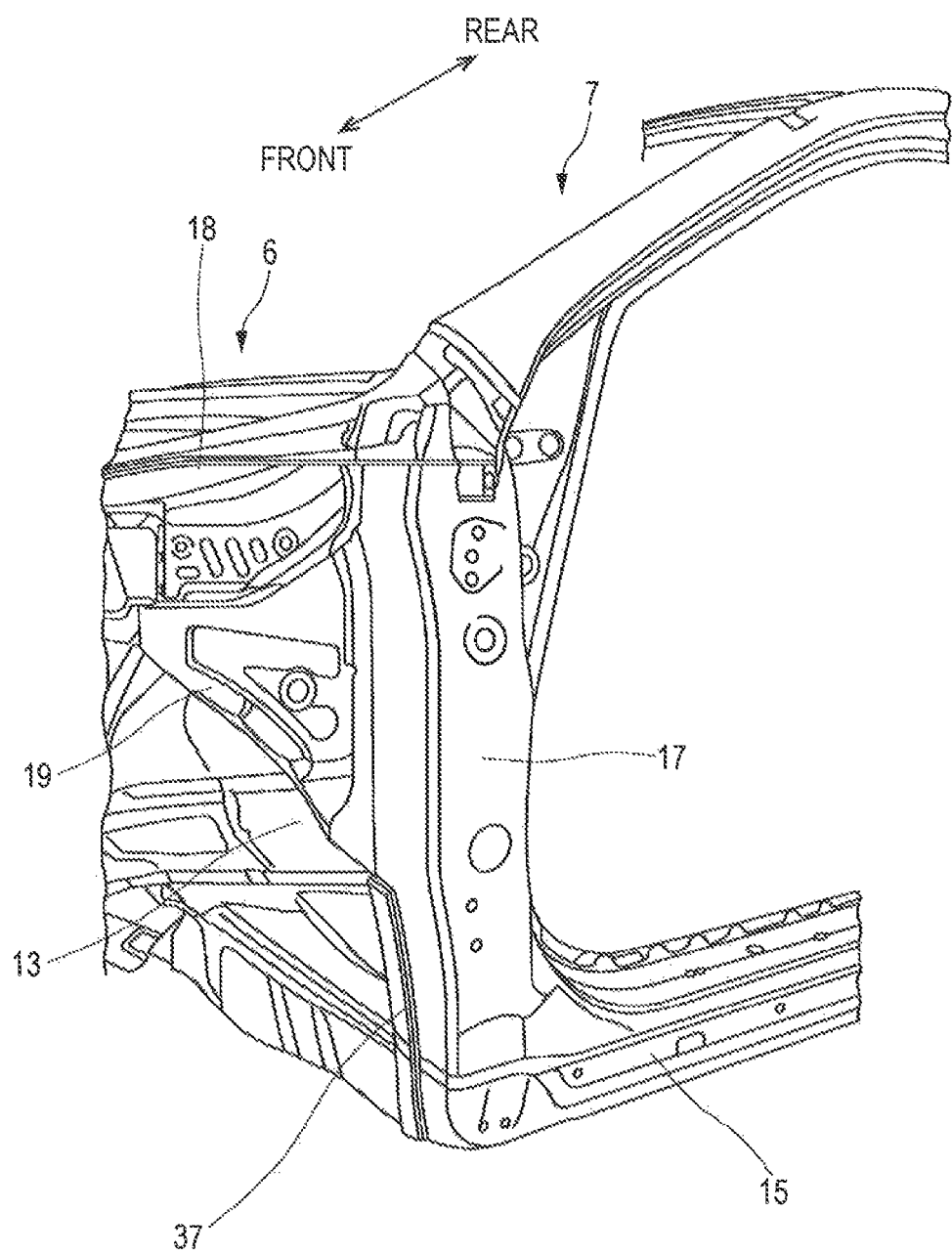
FIG. 5 is a perspective view of parts of the center structure and the side structure, illustrating that a joined section between the structures is bent outward.

FIG. 5 is a perspective view of parts of the center structure 6 and the side structure 7, illustrating that the joined section 37 between the structures 6 and 7 is bent outward. A connected portion between the toe board panel 13 and the A-pillar 17 is illustrated in FIG. 5.

In FIG. 5, the joined section 37 between the toe board panel 13 and the A-pillar 17 is bent outward in the width direction of the vehicle body 1 in a part lower than the stiffening member 19 for reinforcement. The joined section 37 is bent outward in the width direction of the vehicle body 1 at a position behind a front wheel.

Since the joined section 37 is bent in an area lower than the stiffening member 19 for reinforcement, the joined section 37 does not affect a connection state between the stiffening member 19 for reinforcement and the A-pillar 17. It is possible to outwardly bend the joined section 37 that is hit by a detached wheel with certainty, without deteriorating a stiffening performance of the front upper member 18 on account of the stiffening member 19 for reinforcement.

In addition, since the joined section 37 is bent in an area lower than the stiffening member 19 for reinforcement, it is possible to direct the joined section 37 laterally in a region behind a detached front wheel 43 (FIG. 6) that hits and pushes the joined section 37 with high probability.

Thus, since the joined section 37 is directed laterally in a region behind at least a rotary center of the front wheel 43, it is possible to effectively prevent a part of the joined section 37, to which the detached front wheel 43 is likely to apply a strong impact, from being broken.

Next, collision safety performance for a motor vehicle having the vehicle body 1 illustrated in FIG. 1 will be described below.

Figure 6:
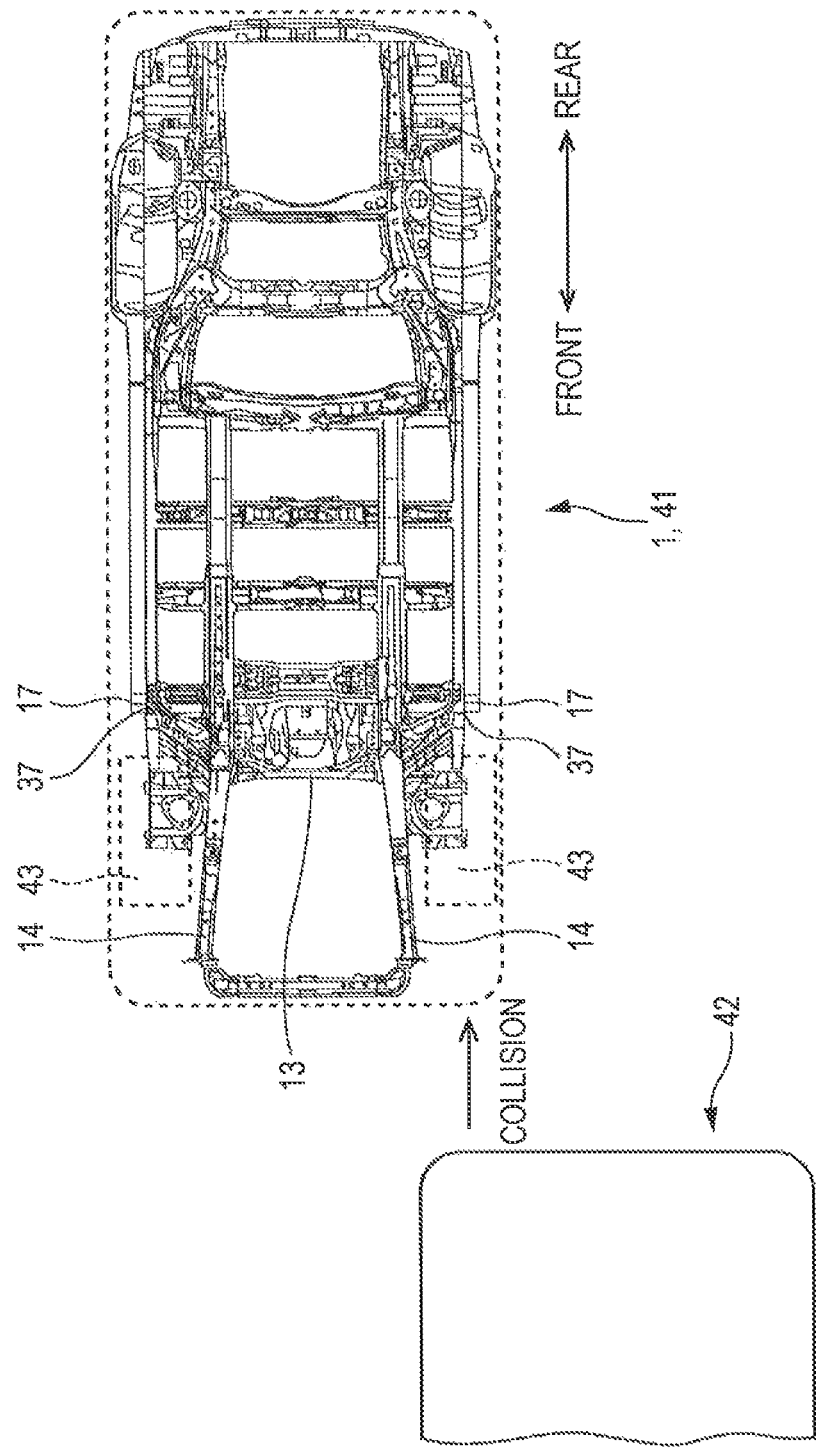
FIG. 6 is a plan view of the vehicle body, illustrating an instance of a collision between motor vehicles.

FIG. 6 is a plan view of the vehicle body 1, illustrating an instance of a collision between motor vehicles. FIG. 6 illustrates a first motor vehicle 41 having the vehicle body 1 illustrated in FIG. 1 and a second motor vehicle 42. In FIG. 6, the exterior of the motor vehicle 41 is illustrated by a dotted line.

The second motor vehicle 42 collides with the first motor vehicle 41 which is, for example, in a stationary state, at a relative speed of 90 km/h. The second motor vehicle 42 collides with an outer side from the pair of front side members 14 of the first motor vehicle 41. In this collision, there is a possibility of the front wheel 43 of the first motor vehicle 41 becoming detached from the axle by the second motor vehicle 42 and the detached front wheel 43 being pushed against the toe board panel 13 or the joined section 37.

Figure 7A:
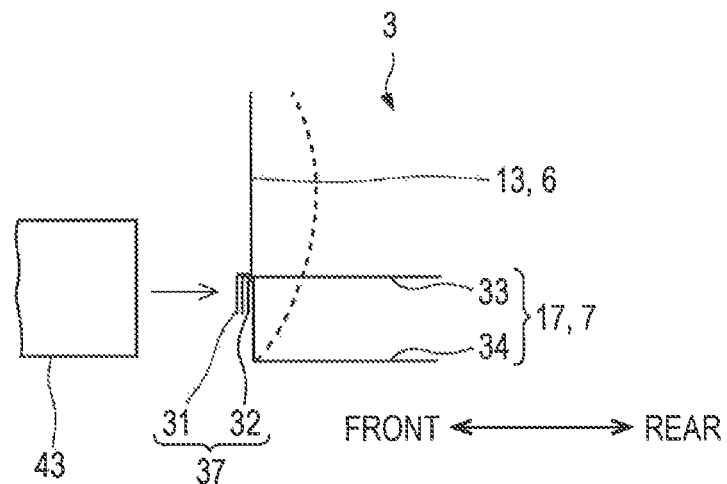
FIG. 7A and FIG. 7B are explanatory views which illustrate a collision of the vehicle body illustrated in FIG. 1.
Figure 7B:
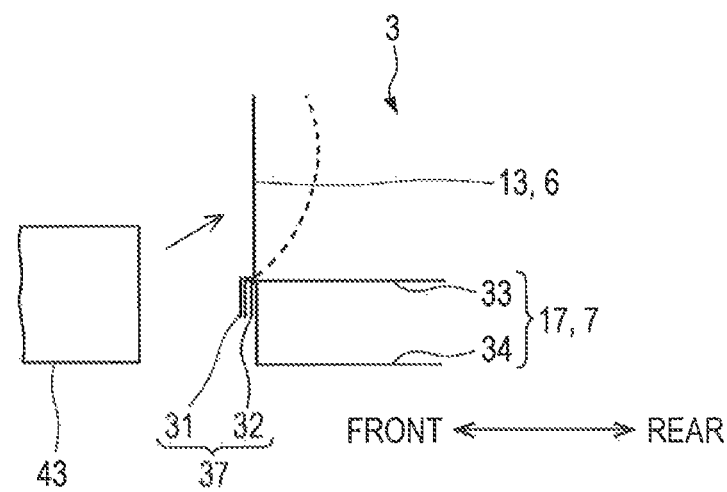

FIG. 7A and FIG. 7B are explanatory views which illustrate a collision of the vehicle body 1 illustrated in FIG. 1. FIGS. 7A and 7B illustrate the detached front wheel 43, the toe board panel 13, the A-pillar 17, and the joined section 37.

FIG. 7A illustrates a case where the detached front wheel 43 is pushed against the joined section 37. If the detached front wheel 43 moves backward in a straight line, there is a possibility of the detached front wheel 43 being pushed against the joined section 37 directly, as illustrated in FIG. 7A.

The joined section 37 in the vehicle body 1 illustrated in FIG. 1 is bent outward away from the vehicle body 1. The inner flange 31 of the toe board panel 13 and the outer flange 32 of the A-pillar 17 in the joined section 37 are superposed on a front side of the A-pillar 17.

Even if the detached front wheel 43 is pushed against the joined section 37, the whole of the joined section 37 is deformed backward, as illustrated by a dotted line in FIG. 7A. In addition, since the A-pillar 17 is located behind the joined section 37, the deformation of the joined section 37 can be suppressed. The inner and outer flanges 31 and 32 in the joined section 37 are not likely to break. As a result, the passenger compartment 3 easily maintains a closed box configuration.

FIG. 7B illustrates a case where the detached front wheel 43 is pushed against the toe board panel 13 inside the joined section 37. If the detached front wheel 43 moves backward in a diagonal direction, there is a possibility of the detached front wheel 43 being pushed against the toe board panel 13, as illustrated in FIG. 7B.

The joined section 37 in the vehicle body 1 illustrated in FIG. 1 is bent outward in the width direction of the vehicle body 1. The inner flange 31 of the toe board panel 13 and the outer flange 32 of the A-pillar 17 in the joined section 37 are superposed on a front side of the A-pillar 17.

Even if the detached front wheel 43 is pushed against the toe board panel 13, the A-pillar 17 can receive a part of an applied load. In addition, even if the toe board panel 13 inside the joined section 37 is deformed backward, as illustrated by a dotted line in FIG. 7B, a force applied to the joined section 37 caused by the deformation acts as a force that slides the inner flange 31 away from the outer flange 32 in the width direction of the vehicle body 1. The inner and outer flanges 31 and 32 in the joined section 37 are not likely to break.

Also, in the case where the outer and inner flanges 32 and 31 are connected by spot welding or the like, the strength of the joined section 37 is stronger in the direction where the inner and outer flanges 31 and 32 are separated from each other rather than in the direction where contact faces between the inner and outer flanges 31 and 32 slide on each other. As a result, the closed box configuration of the passenger compartment 3 is maintained.

Figure 8A:
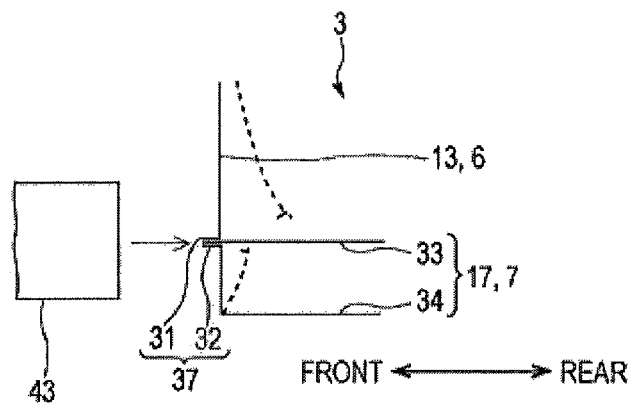
FIG. 8A and FIG. 8B are explanatory views which illustrate a collision of a vehicle body in a comparative instance.
Figure 8B:
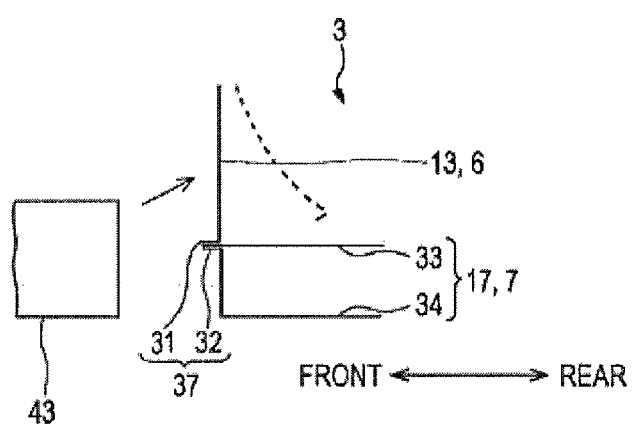

FIG. 8A and FIG. 8B are explanatory views which illustrate a collision of a vehicle body 1 of a comparative instance. FIGS. 8A and 8B illustrate the detached front wheel 43, the toe board panel 13, the A-pillar 17, and the joined section 37.

In the vehicle body 1 of the comparative instance, the joined section 37 between the inner flange 31 of the toe board panel 13 and the outer flange 32 of the A-pillar 17 extends forward. In the case where the center structure 7 and the side structure 7 are merely joined to each other, the joined section 37 extends forward.

FIG. 8A illustrates a case where the detached front wheel 43 is pushed against the joined section 37.

The joined section 37 of the vehicle body 1 of the comparative instance extends forward. The inner flange 31 of the toe board panel 13 and the outer flange 32 of the A-pillar 17 in the joined section 37 are superposed on each other in the width direction. In the case where the detached front wheel 43 is pushed against the joined section 37 that extends forward, there is some possibility that the connection between the inner and outer flanges 31 and 32 in the joined section 37 may be broken. Alternatively, there is some possibility that the joined section 37 itself may be broken. In the case where the connection between the inner and outer flanges 31 and 32 is broken and the flanges 31 and 32 become separated, the passenger compartment 3 is not kept in the closed box configuration.

FIG. 8B illustrates a case where the detached front wheel 43 is pushed against the toe board panel 13 inside the joined section 37.

In the vehicle body 1 of the comparative instance, the joined section 37 extends forward. In the case where the detached front wheel 43 is pushed against the toe board panel 13 inside the joined section 37, an input load is mostly applied to the toe board panel 13. The input load is not mostly applied to the A-pillar 17. In addition, in the case where the toe board panel 13 inside the joined section 37 is deformed backward, as illustrated by a dotted line in FIG. 8B, a force applied to the joined section 37 by the deformation acts as a force in a direction where the inner flange 31 is pulled off from the outer flange 32. Since the strength obtained by the spot welding is weak in the pulling-off direction while the strength is strong in the shearing direction, there is some possibility that the connection between the inner and outer flanges 31 and 32 in the joined section 37 will be broken. In the case where the connection between the inner and outer flanges 31 and 32 is broken and the flanges 31 and 32 become separated, the passenger compartment 3 cannot keep the closed box configuration.

In the example described above, the joined section 37 in which the inner and outer flanges 31 and 32 are joined with each other is bent outward in the width direction of the vehicle body 1.

Accordingly, for example, even if a detached front wheel or the like is pushed against the toe board panel 13 from a front side or a rear side and the toe board panel 13 is deformed, as illustrated in FIG. 7B, the force applied to the joined section 37 by the deformation of the toe board panel 13 acts as a shearing force to the joined section 37. It is difficult for the deformation of the toe board panel 13 to break the connection between the inner and outer flanges 31 and 32.

Also, since the joined section 37 is bent outward in the width direction, the joined section 37 is not oriented in the front-back direction of the load caused by the detached front wheel 43. Accordingly, it is unlikely that the joined section 37 would be deflected and parts thereof would be separated by the load. On the contrary, in the case where the joined section 37 extends in the front-back direction along the load caused by the detached front wheel 43, there is some possibility of the joined section 37 itself being deflected, parts thereof separated, and broken in a pantograph-like configuration, as illustrated in FIG. 8A.

Also, since the whole joined section 37 is bent beforehand at a position behind, for example, the front wheel 43, the joined section 37 is not bent partially when the detached front wheel 43 collides with the joined section 37. If the joined section 37 is bent partially when the detached front wheel 43 collides with the joined section 37, the bent portion of the joined section 37 is likely to break. In the case where the joined section 37 is formed using a plurality of spot-welded points, even if only one welded point is broken, other welded points around the broken point are not likely to break in sequence. In the example of the invention, such sequential breakage can be prevented.

Since the joined section 37 is formed by the joined inner and outer flanges 31 and 32 and is bent outward, the joined section 37 is located in front of the A-pillar 17. Even if the detached front wheel 43 hits the joined section 37, the A-pillar 17 can receive the load applied to the joined section 37. As a result, it is possible to design the joined section 37 so as to prevent the joined section 37 from being deformed significantly.

Accordingly, the vehicle body structure of the invention can enhance the collision safety performance of the vehicle.

It is possible for the vehicle body structure of the example to restrict the toe board panel 13 and the A-pillar 17 from being deformed significantly and to enhance the collision safety performance of the vehicle.

In the case where the center structure 6 having the toe board panel 13 and the side structure 7 having the A-pillar 17 are joined, the inner flange 31 of the toe board panel 13 and the outer flange 32 of the A-pillar 17 extend forward and form the joined section 37. Thereafter, the joined section 37 is bent outward in the width direction of the vehicle body 1.

Accordingly, in a process for producing the vehicle body 1 before joining the center structure 6 and the side structure 7, it is possible to utilize an existing line for producing the vehicle body just as it is. It is possible to reduce alteration of a production line to a minimum. It is possible to suppress an increase in production cost. It is possible to easily join the center structure 6 and the side structure 7.

The inner and outer flanges 31 and 32 are joined in the joined section 37 by tack welding such as spot welding and laser welding. Accordingly, the inner and outer flanges 31 and 32 in the example are joined by using tack welding such as spot welding and laser welding in the existing production line of the vehicle body. In addition, the joined section 37 is bent outward in the width direction of the vehicle body 1. Thus, it is unlikely that any force applied to the joined section 37 would separate parts of the joined section 37, as illustrated in FIGS. 7A and 7B.

On the contrary, in the case illustrated in FIGS. 8A and 8B, if a force were applied to the joined section 37, parts of the joined section 37 would separate. When any one of the connecting points is broken, there is a possibility of a plurality of connecting points made by the tack welding such as spot welding and laser welding breaking in sequence, as is the case with a zipper.

In the example of the invention, since the joined section 37 is bent outward, it is unlikely that any force applied to the joined section 37 would separate parts of the section 37 made by the tack welding such as the spot welding and the laser welding, and it would be difficult to cause such sequential breakage.

Although the example described above is preferable, the invention not limited to the example. Various modifications and alterations can be effected without departing from the gist of the invention.

In the example described above, the invention is applied to, for instance, the joined section 37 between the toe board panel 13 of the center structure 6 and the A-pillar 17 of the side structure 7. However, the invention may be applied to, for instance, a joined section between the rear bulkhead panel 26 of the center structure 6 and the C-pillar 23 of the side structure 7. It is unlikely that the joined section between the panel 26 and the C-pillar 23 would break due to the joined section being bent outward as a result of a collision occurring at the rear side of the vehicle body 1.

In the example described above, the invention is applied to the vehicle body 1 having a three-box structure. However, the invention may be applied to a vehicle such as a motor vehicle having a one-box structure, a motor vehicle having a two-box structure, a truck, a bus, an electric railcar, and an aircraft. In particular, the invention can be preferably applied to a vehicle produced by connecting a pair of side structures 7 with the opposite ends of the center structure 6 in the width direction of the vehicle 1.

The invention claimed is:

1. A vehicle body structure comprising:
    a partition panel that extends in a width direction of the vehicle body rotatably supporting wheels of the vehicle and that divides the vehicle body into a front compartment or a rear compartment and a passenger compartment; and
    a side panel connected with the partition panel in a part corresponding to a front corner or a rear corner of the passenger compartment in a side part of the vehicle body, wherein
    the partition panel has an inner flange provided on an end in the width direction,
    the side panel has an outer flange, and
    the partition panel and the side panel are joined by a joined section joining the inner flange and the outer flange, the joined section having a free-end that is oriented outward in the width direction by a bend in the joined section.

2. The vehicle body structure according to claim 1, wherein the side panel is a member having a pillar located at the front corner or the rear corner of the passenger compartment.

3. The vehicle body structure according to claim 1, wherein the joined section is bent outward at a region located in a front-back direction with respect to wheels rotatably supported on the vehicle body.

4. The vehicle body structure according to claim 2, wherein the joined section is bent outward at a region located in a front-back direction with respect to wheels rotatably supported on the vehicle body.

5. The vehicle body structure according to claim 1, wherein the joined section is bent outward at a region located in the front-back direction with respect to at least a rotation center of the wheel.

6. The vehicle body structure according to claim 2, wherein the joined section is bent outward at a region located in the front-back direction with respect to at least a rotation center of the wheel.

7. The vehicle body structure according to claim 1, further comprising:
    a center structure having the partition panel and forming a center part in the width direction of the vehicle body; and
    a side structure having the side panel and forming a side part of the vehicle body as a result of the side panel being set on a side face of the center structure in the width direction;
    wherein the inner flange of the center structure extends from an end of the partition panel in the front-back direction; and
    the outer flange extends from a periphery of the side structure in the front-back direction.

8. The vehicle body structure according to claim 2, further comprising:
    a center structure having the partition panel and forming a center part in the width direction of the vehicle body; and
    a side structure having the side panel and forming a side part of the vehicle body as a result of the side panel being set on a side face of the center structure in the width direction;
    wherein the inner flange of the center structure extends from an end of the partition panel in the front-back direction; and
    the outer flange extends from a periphery of the side structure in the front-back direction.

9. The vehicle body structure according to claim 1, further comprising tack welds that join the inner flange and the outer flange.

10. The vehicle body structure according to claim 2, further comprising tack welds that join the inner flange and the outer flange.

11. A vehicle frame comprising:
    a partition panel extending in a vehicle-width direction;
    a side panel extending in a vehicle-length direction;
    an inner flange at a vehicle-width end of the partition member; and
    an outer flange at a vehicle-length end of the side panel, wherein
    the partition panel and the side panel are joined with one another via a joined section joining the inner flange and the outer flange, the joined section comprising a free-end that is oriented in a vehicle-width direction by a bend in the joined section, and
    the joined section is bent such that at least a portion of the outer flange lies flush against a surface of the side panel.

12. The vehicle frame according to claim 11, wherein the side panel is a member having a pillar located at a front corner or a rear corner of a passenger compartment.

13. The vehicle frame according to claim 11, wherein the joined section is bent outward at a region located in a front-back direction with respect to wheels rotatably supported on the vehicle frame.

14. The vehicle frame according to claim 11, wherein the joined section is bent at a region located in the front-back direction with respect to at least a rotation center of the wheel.

15. The vehicle frame according to claim 11, further comprising:
    a center structure having the partition panel and forming a center part in the vehicle-width direction; and
    a side structure having the side panel and forming a side part with the side panel set on a side face of the center structure in the vehicle-width direction, wherein the inner flange extends in the vehicle-length direction; and the outer flange extends in the vehicle-length direction.

16. The vehicle frame according to claim 11, further comprising tack welds that join the inner flange and the outer flange.

17. A vehicle frame comprising:
a partition panel extending in a vehicle-width direction;
a side panel extending in a vehicle-length direction;
an inner flange at a vehicle-width end of the partition member; and
an outer flange at a vehicle-length end of the side panel, wherein
the partition panel and the side panel are joined with one another via a joined section joining the inner flange and the outer flange, the joined section being bent in a vehicle-width direction, and
the inner flange has a free-end, the outer flange has a free-end, and the inner flange and outer flange are aligned to extend along a common direction of elongation toward their respective free-ends, and
the joined section is bent such that at least a portion of the outer flange lies flush against a surface of the side panel.

18. A vehicle frame comprising:
a partition panel extending in a vehicle-width direction;
a side panel extending in a vehicle-length direction;
an inner flange at a vehicle-width end of the partition member; and
an outer flange at a vehicle-length end of the side panel, wherein
the partition panel and the side panel are joined with one another via a joined section joining the inner flange and the outer flange, the joined section being bent in a vehicle-width direction by way of a bending in the inner flange and a bending in the outer flange, with the bending in the inner flange and the bending in the outer flange being aligned to bend about a common point of curvature, and
the joined section is bent such that at least a portion of the outer flange lies flush against a surface of the side panel.

19. The vehicle body structure according to claim 1, wherein the joined section is bent such that at least a portion of the outer flange lies flush against a surface of the side panel.

* * * * *